United States Patent [19]

Anderssen

[11] Patent Number: 5,007,480

[45] Date of Patent: Apr. 16, 1991

[54] USE OF MANGANESE OXIDE IN DRILLING MUD AND OIL WELL CEMENT SLURRIES

[75] Inventor: Sverre Anderssen, Kristiansand, Norway

[73] Assignee: Elkem a/s, Norway

[21] Appl. No.: 315,466

[22] Filed: Feb. 24, 1989

[30] Foreign Application Priority Data

Mar. 8, 1988 [NO] Norway ................. 881017

[51] Int. Cl.$^5$ .................. C09K 7/04; E21B 21/00; E21B 33/14
[52] U.S. Cl. ................... 166/292; 106/683; 106/733; 106/819; 175/65; 252/8.51
[58] Field of Search ............ 166/292; 175/65; 405/266; 106/89, 97, 314, 683, 733, 819; 252/8.51, 8.514, 8.551

[56] References Cited

U.S. PATENT DOCUMENTS

| | | | |
|---|---|---|---|
| 2,279,262 | 4/1942 | Edwards | 166/292 X |
| 3,305,352 | 2/1967 | Day | 75/59.12 X |
| 3,658,701 | 4/1972 | McGlothlin et al. | 252/8.514 |
| 4,447,339 | 5/1984 | Detrot | 252/8.511 |
| 4,584,327 | 4/1986 | Sutton | 166/292 |
| 4,855,083 | 8/1989 | Kagawa et al. | 106/97 X |

FOREIGN PATENT DOCUMENTS

| | | | |
|---|---|---|---|
| 852820 | 9/1981 | U.S.S.R. | 106/89 |
| 1073274 | 2/1984 | U.S.S.R. | 252/8.514 |
| 685563 | 1/1953 | United Kingdom | 252/8.514 |
| 2055412 | 3/1981 | United Kingdom . | |
| 2066876 | 7/1981 | United Kingdom . | |
| 2101109 | 1/1983 | United Kingdom . | |

*Primary Examiner*—George A. Suchfield
*Attorney, Agent, or Firm*—Lucas & Just

[57] ABSTRACT

The present invention relates to the use of manganomanganic oxide particles containing at least 90% by weight of manganomanganic oxide, said particles having a density of 4.50 to 4.75 g/cm$^3$ and a particle size of at least 98% below 10 µm, as a weight material for drilling mud fluids and for cement slurries for cementing oil wells.

The manganomanganic oxide particles which are used are preferably recovered from off-gases which evolves during refining of ferro-manganese melts.

28 Claims, No Drawings

USE OF MANGANESE OXIDE IN DRILLING MUD AND OIL WELL CEMENT SLURRIES

The present invention relates to the use of a waste product from refining of ferro-manganese alloys as a weight material in oil well cement slurries and in drilling mud fluids which are used during drilling of oil wells.

During drilling of oil wells a drilling mud is circulated in the well. The main purpose of the drilling mud is is to maintain a hydrostatic pressure in the well which is higher than the pressure in oil- and gas containing layers in the formation through which the well is drilled in order to prevent uncontrolled blow-outs from the well. Further the drilling mud is used for transporting out of the well particles which are released during drilling. In order to obtain a necessary density of the drilling mud, so-called weight materials have to be added to the drilling mud. As weight materials inert materials having a high density are used. Examples of known weight materials are barite, hematite and ilmenite. The weight materials are used in fine particular form, the particle size normally being smaller than 75 mm and preferably smaler than 50 mm.

During cementing of oil wells a cement slurry is pumped into the annulus between the wall of the well and casing pipes arranged in the well bore. The purpose of the cementation is to seal the annulus between the casing and the wall of the well in order to prevent transport of gas and oil in this annulus. In cementing of oil wells cement slurries having a density corresponding at least to the hydrostatic pressure in the oil well have to be used. For cementing oil wells which are drilled through high pressure formations, cement slurries having a high density have to be used. High density cement slurries are obtained by addition of weight materials. As weight materials for high density cement slurries the same materials are normally used as the materials used for increasing the density of drilling muds. An important requirement which the weight materials for use in oil well cement slurries has to meet, is that the weight materials have to fullfill certain properties in connection with the rheology of the cement slurries. It is thus important that a necessary amount of weight material can be added without increasing the viscosity to such an extent that it will be difficult to pump the cement slurries into the annulus between the wall of the well and the casing pipes. Further is it of importance that the settling tendency of the weight material is low. If the settling tendency is high, the density of the oil well cement will vary with height and there will be a risk for losing control of the well.

It is an object of the present invention to provide a weight material which can be used in drilling mud and in cement slurries which material shows surprisingly good properties in drilling mud and in cement slurries.

Accordingly, the present invention relates to the use of a manganomanganic oxide material containing at least 90% by weight of manganomanganic oxide ($Mn_3O_4$), the remainder being calcium oxide, magnesium oxide, potassium oxide and silicon dioxide and less than 1% by weight of elemental manganese, said material having a density between 4.50 and 4.75 g/cm$^3$ and a particle size of at least 98% below 10 μm, as a weight material for drilling mud and for oil well cement slurries.

The manganomanganic oxide particles which are used in the present invention have a higher density than the conventionally used weight materials. By the present invention it is thereby possible to produce drilling mud and oil well cement slurries having a higher density than what is obtainable by use of conventional weight materials. Further it has surprisingly been found that the mangano-manganic oxide particles reduces the tendency to settle and gives a higher strength of the cured cement slurries.

The manganomanganic oxide particles which are used in the various aspects of the invention are recovered from gases which evolve during oxygen refining of molten ferro-manganese. The particles are thus a waste product which normally has to be disposed of.

Conventional ferro-manganese produced in a blast furnace or in an electro-metallurgical furnace and the like at high temperature of about 1200° C. or more, may contain up to 6 or more percent of carbon. The carbon content is usually reduced, as for example, to about 1.5% by blowing oxygen or a mixture of oxygen and air through or against the surface of a bath of molten ferro-manganese. This is done in a separate vessel that contains a molten-ferro-manganese bath freshly tapped from the electric furnace and at a temperature of about 1000° C. or more and preferably at about 1300° C. or more.

One procedure for reducing the carbon content of molten ferro-manganese is described in U.S. Pat. No. 3,305,352 issued Feb. 21, 1967. In this preferred procedure for producing the manganomanganic oxide fume of the present invention, ferro-manganese is tapped from the electric furnace in which it is produced into a treating vessel such as a ladle or furnace at a temperature of about 1300° C. or more. Any slag is preferably skimmed off and then oxygen is top blown against the surface of the molten ferro-manganese bath by any convenient means such as one or more conventional oxygen blowing lances held about 2.5 cm above the surface to direct one or more streams of oxygen at a pressure of about 7.7 to about 10.5 kg/cm$^2$ to impinge against the surface of the bath. The flow of oxygen is about 1.8 to about 23 kg per minute for a 227 kg molten bath in a ladle about 76 cm high and 51 cm inside diameter. The foregoing procedure may be scaled up as desired. The off-gas thereby produced contains very finely divided particles of manganomanganic oxide fume of spherical configuration which are easily recovered from the off-gas by conventional recovery apparatus.

If desired, the manganomanganic oxide fume of the present invention may further be produced as a by-product of the specific procedure described in U.S. Pat. No. 3,305,352 for reducing the carbon content of the ferro-manganese bath. In such case, the ferro-manganese bath will be top blown at a rate sufficient to heat the bath to a temperature of 1700° C. before the carbon content of the molten metal has been reduced to 1.5% C. Oxygen blowing will continue until the bath temperature reaches about 1750° C. as described in the patent. The manganomanganic oxide fume is recovered from the off-gas in conventional manner.

The data given below outlines some typical characteristics of the manganomanganic oxide fume produced as specified above for use in accordance with the present invention:

Chemical Formula: Essentially $Mn_3O_4$. Typically, 96% to 98% by weight manganomanganic oxide, the balance being a mixture which includes calcium oxide, magnesium oxide, potassium oxide and silicon with less than about 1% by weight of free manganese metal.

Chemical Analysis (typical wt %): 65.27 Mn; 2.03 Fe; 0.029 Al; 0.28 Si; 0.17 C; 0.040 P; 0.045 As; 0.46 Ca; 1.43 Mg; 0.072 K; 0.023 Cr; and 0.002 Pb.

Bulk Density: 720–1440 kg/m$^3$.
Moisture: 0.22% (1 hour at 107° C.)
Particle Size: 98% below about 10 microns.
Shape: Spherical
Specific Gravity: 4.6 to 4.75 grams/cm$^3$.
Thermal Stability: No effect up to 600° C.

The present invention will now be further described in connection with the following examples.

EXAMPLE 1

Three high density cement slurries A, B and C for oil well cementing were prepared. The cement slurries contained different amounts of $Mn_3O_4$-particles. The specific weight of the $Mn_3O_4$ particles were 4.6 g/cm$^3$ and the particles size was 98 weight % below 10 μm.

| The chemical analysis of the $Mn_3O_4$-particles was as follows: | |
|---|---|
| Mn | 64.5% (= 90% $Mn_3O_4$) |
| FeO | 0.5% |
| $Fe_2O_3$ | 3.9% |
| CaO | 2.4% |
| MgO | 2.3% |
| $SiO_2$ | 0.6% |
| S | 0.05% |
| As | 0.028% |
| Cd | 0.002% |

The compositions of cement slurries A, B, C is shown in Table I.

TABLE I

| | A weight by percent | B weight by percent | C weight by percent |
|---|---|---|---|
| G-cement | 61.1 | 55.1 | 49.8 |
| Thinner (D-31) | 0.7 | 0.7 | 2.4 |
| $Mn_3O_4$-particles | 11.7 | 20.4 | 27.4 |
| Water | 26.5 | 23.8 | 20.4 |
| Density g/cm$^3$ | 2.04 | 2.16 | 2.27 |

G-cement is a Portland cement produced by Norcem A/S, Norway.
D-31 is a thinner produced by B. J. Hughes, USA.

For comparison purposes three conventional cement slurries D, E, F having the same density as the slurries A, B, C respectively and using barite as weight material were prepared.

The cement slurries A through F were prepared and tested according to API Specification 10: "API Specification for Materials and Testing for Well Cements".

TABLE II

| | SLURRIES | | | | | |
|---|---|---|---|---|---|---|
| RHEOLOGY (20° C.) | A | B | C | D | E | F |
| Apparent viscosity, cp | 29 | 40 | 45 | 56 | 90 | * |
| Plastic viscosity, cp | 31 | 33 | 47 | 57 | 86 | * |
| Yield, lb/100 ft$^2$ | −4 | 14 | −5 | −3 | 8 | * |

*Slurry F became to viscous in order to measure viscosity and yield point.

As can be seen from Table II the slurries A-C containing $M_3O_4$-particles as weight material, have a lower viscosity than the slurries D-F containing barite as weight material. Slurry F having a density of 2.27 g/cm$^3$ became so viscous that it cannot be used for cementing oil wells. The results shown in Table II thus show that cement slurries containing the $Mn_3O_4$-particles as weight material have better rheological properties than the slurries containing barite as weight material.

In order to compare the compression strength after curing, test specimens were made from slurries B and E. The test specimens were cured in water at 20° C. for 17 and 28 days. The results are shown in Table III.

TABLE III

| | SLURRIES | |
|---|---|---|
| | B | E |
| TIME | Compressive strength, MPa | |
| 1 Day | 12.2 | 11.4 |
| 7 Days | 35.5 | 32.1 |
| 4 Days | 52.7 | 46.1 |

Table III shows that the test specimens from slurry B, containing $Mn_3O_4$-particles have a higher compressive strength than the test specimens from slurry E which contains the conventional weight material barite.

EXAMPLE 2

Two drilling mud fluids A and B were prepared. Drilling mud fluid A contained a mixture of 90% barite and 10% $Mn_3O_4$ particles as weight material and drilling mud fluid B contained a mixture of 75% barite and 25% $Mn_3O_4$-particles as weight material. The $Mn_3O_4$-particles were of the same chemical analysis and specific weight as the $Mn_3O_4$-particles used in example 1.

For comparison purposes a drilling mud fluid C was prepared containing only barite as weight material. The drilling fluids A–C were prepared according to API RP 131 2API "Recommended Practice Standard Procedure for Laboratory Testing Drilling Fluids". The results of the rheological properties of the drilling mud fluids A–C are shown in Table IV.

TABLE IV

| | DRILLING MUD FLUID | | |
|---|---|---|---|
| Rheology (20° C.) | A | B | C |
| Apparent viscosity, cp | 52.5 | 105.5 | 47 |
| Plastic viscosity, cp | 51.0 | 66.0 | 50 |
| Yield point, lb/100 ft$^2$ | 3 | 79 | 3 |
| Gel strength, 10 sek. | 0 | 80 | 1 |
| Gel strength, 10 min. | 6 | 15 | 270 |

The gel strength was measured according to API RP 131: "API Recommanded Practice Standard Procedure for Field Testing Drilling Fluids."

It is evident from Table IV that the $Mn_3O_4$-particles to a high extent can be used as a weight material without seriously effecting the viscosity and the gel strength of the drilling mud. Thus by using a mixture of conventional weight materials and $Mn_3O_4$-particles it is possible to obtain a drilling mud fluid with higher density than what is possible by using barite or other conventional weight materials alone.

The abrasivity of the $Mn_3O_4$-particles and of barite was tested by measuring the weight loss of the rotor blades according to the API RP 131 procedure. The results showed that while barite gave a weight loss of 6.8 mg/min., the weight loss when using the $Mn_3O_4$-particles was reduced to 0.6 mg/min. This shows that the $Mn_3O_4$-particles give a much lower abrasive wear than barite particles.

What is claimed:

1. An oil well cement slurry comprising cement, water, and a manganomanganic oxide particulate material, the material containing at least about 90% by weight of manganomanganic oxide, the material having a density between about 4.50 and about 4.75 g/cm$^3$ and a particle size of at least about 98% below about 10 μm.

2. The cement slurry of claim 1 wherein the manganomanganic particulate material is recovered from an off-gas of a ferromanganese melt.

3. The cement slurry of claim 1 wherein the manganomanganic particulate material contains between about 96 and about 98% by weight manganomanganic oxide.

4. The cement slurry of claim 1 wherein the manganomanganic particulate material has a bulk density of between about 720 and about 1440 kg/m$^3$.

5. The cement slurry of claim 1 wherein the cement slurry contains between about 11.7 and about 27.4% by weight manganomanganic oxide particulate material.

6. The cement slurry of claim 1 wherein the cement slurry has a density between about 2.04 and about 2.27 g/cm$^3$.

7. A method for cementing the annulus of an oil well comprising forming the oil well cement slurry of claim 1; and introducing the slurry between the annulus and the wall of the well.

8. The method of claim 7 wherein the manganomanganic particulate material is recovered from an off-gas of a ferromanganese melt.

9. The method of claim 7 wherein the manganomanganic particulate material contains between about 96 and about 98% by weight manganomanganic oxide.

10. The method of claim 7 wherein the manganomanganic particulate material has a bulk density of between about 720 and about 1440 kg/m$^3$.

11. The method of claim 7 wherein the cement slurry contains between about 11.7 and about 27.4% by weight manganomanganic oxide particulate material.

12. The method of claim 7 wherein the cement slurry has a density between about 2.04 and about 2.27 g/cm$^3$.

13. An oil well drilling mud comprising water and a weighted component, the weighted component having as an essential ingredient therein a manganomanganic oxide particulate material, the material containing at least about 90% by weight of manganomanganic oxide, the material having a density between about 4.50 and about 4.75 g/cm$^3$ and a particle size of at least about 98% below about 10 μm.

14. The drilling mud of claim 13 wherein the manganomanganic particulate material is recovered from an off-gas of a ferromanganese melt.

15. The drilling mud of claim 13 wherein the manganomanganic particulate material contains between about 96 and about 98% by weight manganomanganic oxide.

16. The drilling mud of claim 13 wherein the manganomanganic particulate material has a bulk density of between about 720 and about 1440 kg/m$^3$.

17. The drilling mud of claim 13 wherein the weighted component of the drilling mud contains between about 10 and about 25% by weight manganomanganic oxide particulate material.

18. The drilling mud of claim 13 wherein the weighted component of the drilling mud contains between about 90 and about 75% by weight barite.

19. A method for drilling an oil well comprising forming the oil well drilling mud of claim 15; and introducing the drilling mud around the drill bit used for drilling an oil well during a drilling operation.

20. The method of claim 19 wherein the manganomanganic particulate material is recovered from an off-gas of a ferromanganese melt.

21. The method of claim 19 wherein the manganomanganic particulate material contains between about 96 and about 98% by weight manganomanganic oxide.

22. The method of claim 19 wherein the manganomanganic particulate material has a bulk density of between about 720 and about 1440 kg/m$^3$.

23. The method of claim 19 wherein the weighted component of the drilling mud contains between about 10 and about 25% by weight manganomanganic oxide particulate material.

24. The method of claim 19 wherein the weighted component of the drilling mud contains between about 90 and about 75% by weight barite.

25. A cementitious material comprising cement, water, and a manganomanganic oxide particulate material, the material containing at least about 90% by weight of manganomanganic oxide, the material having a density between about 4.50 and about 4.75 g/cm$^3$ and a particle size of at least about 98% below about 10 μm.

26. The cementitious material of claim 25 wherein the manganomanganic particulate material is recovered from an off-gas of a ferromanganese melt.

27. The cementitious material of claim 25 wherein the manganomanganic particulate material contains between about 96 and about 98% by weight manganomanganic oxide.

28. The cementitious material of claim 26 wherein the manganomanganic particulate material has a bulk density of between about 720 and about 1440 kg/m$^3$.

* * * * *

UNITED STATES PATENT AND TRADEMARK OFFICE
CERTIFICATE OF CORRECTION

PATENT NO.　: 5,007,480
DATED　　　: April 16, 1991
INVENTOR(S) : Sverre Anderssen

It is certified that error appears in the above-identified patent and that said Letters Patent is hereby corrected as shown below:

Column 1, line 12, delete the second occurrence of "is".

Column 1, line 25, change "smaler" to --smaller--.

Column 3, line 2, after "silicon" insert --dioxide--.

Column 3, line 53, prior to Table II, insert --The results are shown in Table II.--

Column 3, line 60 (the footnote to Table II), change the first occurrence of "to" to --too--.

Column 4, line 6, change "17" to --1, 7--.

Column 4, line 15 (the last entry in Table III), change "4 Days" to --28 Days--.

Column 4, line 48, change "Recommanded" to --Recommended--.

Column 4, line 52, change "effecting" to --affecting--.

Signed and Sealed this

Eighth Day of September, 1992

Attest:

DOUGLAS B. COMER

Attesting Officer　　　　Acting Commissioner of Patents and Trademarks